(12) United States Patent
Kesler et al.

(10) Patent No.: US 9,687,012 B2
(45) Date of Patent: Jun. 27, 2017

(54) NON-DAIRY FORMULAE

(71) Applicants: Uriel Kesler, Yahud (IL); Hamutal Yitzhak, Tel Aviv (IL)

(72) Inventors: Uriel Kesler, Yahud (IL); Hamutal Yitzhak, Tel Aviv (IL)

(*) Notice: Subject to any disclaimer, the term of this patent is extended or adjusted under 35 U.S.C. 154(b) by 0 days.

(21) Appl. No.: 14/767,028

(22) PCT Filed: Feb. 12, 2014

(86) PCT No.: PCT/IL2014/050153
§ 371 (c)(1),
(2) Date: Aug. 11, 2015

(87) PCT Pub. No.: WO2014/125485
PCT Pub. Date: Aug. 21, 2014

(65) Prior Publication Data
US 2015/0366254 A1    Dec. 24, 2015

Related U.S. Application Data

(60) Provisional application No. 61/763,705, filed on Feb. 12, 2013.

(51) Int. Cl.
| | | |
|---|---|---|
| A23L 1/29 | (2006.01) | |
| A23L 2/39 | (2006.01) | |
| A23L 33/00 | (2016.01) | |
| A23L 33/12 | (2016.01) | |
| A23L 33/135 | (2016.01) | |
| A23L 33/15 | (2016.01) | |
| A23L 33/16 | (2016.01) | |
| A23L 33/175 | (2016.01) | |
| A23L 25/00 | (2016.01) | |

(52) U.S. Cl.
CPC .............. *A23L 1/296* (2013.01); *A23L 2/39* (2013.01); *A23L 25/00* (2016.08); *A23L 25/30* (2016.08); *A23L 33/00* (2016.08); *A23L 33/12* (2016.08); *A23L 33/135* (2016.08); *A23L 33/15* (2016.08); *A23L 33/16* (2016.08); *A23L 33/175* (2016.08); *A23L 33/40* (2016.08); *A23V 2002/00* (2013.01)

(58) Field of Classification Search
CPC ........ A23L 1/296; A23L 1/299; A23L 1/3008; A23L 1/3014; A23L 1/302; A23L 1/304; A23L 1/3051
USPC ....... 426/629, 648, 656, 658, 601, 598, 464, 426/466, 520, 801
See application file for complete search history.

(56) References Cited

U.S. PATENT DOCUMENTS 7,118,776 B2 * 10/2006 Wong ................ A23L 2/02
426/590
2006/0110521 A1   5/2006 Heise et al.

| | | |
|---|---|---|
| 2011/0182943 A1 | 7/2011 | Kanwar et al. |
| 2011/0183062 A1 | 7/2011 | Ursel et al. |
| 2011/0200570 A1 | 8/2011 | Mosbaugh et al. |

FOREIGN PATENT DOCUMENTS

| | | |
|---|---|---|
| CN | 1066389 A | 11/1992 |
| CN | 1179322 A | 4/1998 |
| CN | 1348705 A | 5/2002 |
| CN | 1500505 A | 6/2004 |
| CN | 1548124 A | 11/2004 |
| CN | 101066394 A | 11/2007 |
| CN | 101152387 A | 4/2008 |
| CN | 101167945 A | 4/2008 |
| CN | 101167994 A | 4/2008 |
| CN | 101332247 A | 12/2008 |
| CN | 101385515 A | 3/2009 |
| CN | 101455767 A | 6/2009 |
| CN | 101773580 A | 7/2010 |
| CN | 102907638 | 2/2013 |
| IT | ME960004 | 1/1996 |
| IT | 1297743 B1 | 12/1999 |
| JP | 61257149 | 11/1986 |
| WO | 2007140074 A2 | 6/2007 |
| WO | 2009030452 A1 | 3/2009 |
| WO | 2009030487 A2 | 3/2009 |

OTHER PUBLICATIONS

Alternatives to Cow's Milk downloaded on Feb. 15, 2016 from http://parents.berkeley.edu/advice/eating/alternatives.html.
Pros and Cons of Almond Milk downloaded on Feb. 15, 2016 from http://www.fitday.com/fitness-articles/nutrition/healthy-eating/pros-and-cons-of-almond-milk.html.
Homemade Baby Food: Almond Milk downloaded on Feb. 15, 2016 from http://www.wholefoodmommies.com/home/recipes?rid=3cfa8060-fb32-4936-a58c-24f12ab86019.
Homemade almond milk downloaded on Feb. 15, 2016 from http://littlefoodies.se/food-for-kids-homemade-almond-milk/.
Salpietro 2005, 57(4):173-80.
Holzmeister, 2007, 24(2):75-6, 79-82, "Supermarket smarts. Non-dairy milks."
Doron D et al, 2001, 20(3):259-61, "Nutritional deficits resulting from an almond-based infant diet."
Infant formulas-overview downloaded on Feb. 15, 2016 from http://www.nlm.nih.gov/medlineplus/ency/article/002447.htm.
Codex Stan 72, Standard for Infant Formula and Formulas for Special Medical Purposes Intended for Infants (1981).
Souci et al., "Almond" in Food Composition and Nutrition Tables, pp. 1022-1023 (2000), Medpharm and CRC Press,XP002761636.
"Kids Soy Drink 4", Mintel, Downloaded from gnpd.com, 2012, XP002761633.
"Infant Formula & Cereal", Mintel, Downloaded from gnpd.com, 2001, XP002761634.

* cited by examiner

*Primary Examiner* — Helen F Heggestad
(74) *Attorney, Agent, or Firm* — Browdy and Neimark, PLLC

(57) ABSTRACT

The present invention is directed to non-dairy almond based formulae for the preparation of infant or toddler formula or other types of supplemental or functional food.

19 Claims, No Drawings

NON-DAIRY FORMULAE

TECHNOLOGICAL FIELD

This invention is directed to non-dairy almond based formulae for the preparation of infant or toddler formula or other types of supplemental or functional food.

BACKGROUND

Infant formula is a manufactured food designed and marketed for feeding babies and infants under 12 months of age, usually prepared for bottle-feeding or cup-feeding from powder (mixed with water) or liquid (with or without additional water). The U.S. Federal Food, Drug, and Cosmetic Act (FFDCA) defines infant formula as "a food which purports to be or is represented for special dietary use solely as a food for infants by reason of its simulation of human milk or its suitability as a complete or partial substitute for human milk".

The composition of infant formula is designed to be roughly based on a human mother's milk at approximately one to three months postpartum, although there are significant differences in the nutrient content of these products. The most commonly used infant formulas contain purified cow's milk whey and casein and/or skimmed milk powder as a protein source, a blend of vegetable oils as a fat source, lactose as a carbohydrate source, a vitamin-mineral mix, and other ingredients depending on the manufacturer.

A 2001 World Health Organization (WHO) report found that infant formula prepared in accordance with applicable Codex Alimentarius standards was a safe complementary food and a suitable breast milk substitute.

As most of the infant formulas are based on cow's milk whey and casein as a protein source, many babies develop allergy or intolerance condition that may be at times, life threatening.

Cow's milk allergy is a food allergy, an adverse immune reaction to one or more of the constituents of Cow's milk (most commonly the protein alpha S1-casein). This milk-induced allergic reaction can involve anaphylaxis, a potentially life-threatening condition.

The principal symptoms are gastrointestinal, dermatological and respiratory. These can translate to: skin rash, hives, vomiting, and gastric distress such as diarrhea, constipation, stomach pain or flatulence. The clinical spectrum extends to diverse disorders: anaphylactic reactions, atopic dermatitis, wheeze, infantile colic, gastroesophageal reflux (GER), oesophagitis, allergic colitis, headache, oral irritation, and constipation. The symptoms may occur within a few minutes after exposure in immediate reactions, or after hours (and in some cases after several days) in delayed reactions.

Some babies may develop or are born with lactose intolerance which is a non-allergic food sensitivity, and comes from a lack of production of the enzyme lactase, required to digest the predominant sugar in milk. Adverse effects of lactose intolerance generally occur after much higher levels of milk consumption than do adverse effects of milk allergy. Milk protein intolerance (MPI) is delayed reaction to a food protein that is normally harmless to the non-allergic, non-intolerant individual. Milk protein intolerance produces a non-IgE antibody and is not detected by allergy blood tests. Milk protein intolerance produces a range of symptoms very similar to milk allergy symptoms, but can also include blood and/or mucus in the stool. Treatment for milk protein intolerance is the same as for milk allergy. Milk protein intolerance is also referred to as milk soy protein intolerance (MSPI).

For formula fed infants, milk substitute formulas are used to provide a complete source of nutrition. Milk substitutes include soy based formulas; hypoallergenic formulas based on partially or extensively hydrolyzed protein, and free amino acid-based formulas.

Non-milk derived amino acid-based formulas, known as amino acid formulas or elemental formulas, are considered the gold standard in the treatment of cows milk allergy when the mother is unable to breastfeed.

Hydrolyzed formulas come in partially hydrolyzed and extensively hydrolyzed varieties. Partially hydrolyzed formulas (PHFs) are characterized by a larger proportion of long chain peptides and are considered more palatable. However, they are intended for milder cases and are not considered suitable for treatment of moderate to severe milk allergy or intolerance. Extensively hydrolyzed formulas (EHFs) are composed of proteins that have been largely broken down into free amino acids and short peptides. Casein and whey are the most commonly used sources of protein in hydrolyzed formulas because of their high nutritional quality and their amino acid composition.

Soy based formula may or may not pose a risk of allergic sensitivity, as some infants who are allergic to milk may also be allergic to soy. Also soy based formulas are not recommended for infants under 6 months.

Infant formulas also come in a variety of types:

Cow's milk formula is the most commonly used type (e.g.: Similac, Enfamil).

Soy protein based formulas are frequently used for infants allergic to cow's milk (e.g.: Isomil, ProSobee).

Partially hydrolyzed formulas (e.g.: Good Start and Gentlease brands) are marketed as having improved digestibility.

Extensively hydrolyzed formulas (e.g.: Alimentum, Nutramigen, and Pregestimil) are considered "hypoallergenic". One study reported that 90% of children with cow's milk allergies will tolerate them.

Amino acid based formulas (e.g.: Neocate, EleCare, and Nutramigen AA) are more expensive, but are reported least likely to cause allergic reactions.

Hypoallergenic formulas, such as those containing free individual amino acids, and sometimes referred to as elemental infant formula, are considered to reduce the likelihood of certain medical complications in babies with specific health problems, such as severe allergies to cow's milk and soy. Made of purely synthetic monomeric amino acids, they are often considered quite foul-tasting, and it is not uncommon for infants to reject elemental formulas after having been established on a sweeter-tasting regular formula, thus the level of compliance of infants in an age wherein feeding is crucial, such incompliance is life threatening.

SPIFs (Soy Protein Infant Formulae) contain phytoestrogens, mostly isoflavonoids (particularly diadzein, genistein). It was shown that these substances tend to bind to estrogen receptors and behave as pro- or anti-estrogens. The amount of phytoestrogens in SPIF (32-47 mg/liter) is 40 times higher than the amount in breast milk. Consumption of isoflavonoids from SPIF reaches 11 mg/kg body weight per day, and their levels in infant blood were 13,000 to 22,000 times higher than the blood levels of estrogen-like substances in the first years of life. Infants who are fed only on SPIF are exposed to a daily consumption of isoflavonoids that is 4-13 times the amount presumed to have a physiological effect on balancing the menstrual cycle in women.

Recently the scientific literature has raised some concerns regarding the vast consumption of SPIFs regarding the fact that phytoestrogens could have an adverse effect on infant and child growth (they are not recommended for premature infants weighing less than 1800 grams), development and puberty, bone health and thyroid function. In addition, the fact that most of the soy crops are genetically engineered the use of SPIF is not recommended in certain countries and is regulated to the extent of requiring a prescription for administration for infants having severe allergies.

There is therefore a true need in the art for a non-dairy formula for infants that can provide all essential nutritional needs similar to the gold standard of breast milk nutritional profile without the disadvantages of currently known non-dairy formula.

GENERAL DESCRIPTION

In the first of its aspects the present invention provides a composition comprising almond and at least one non-dairy component comprising all essential amino acids, wherein said composition is a non-dairy composition for use in the nutrition of an infant and/or a toddler.

In some embodiments of the invention said composition provides a nutritional dose for a single feeding portion to an infant and/or a toddler in a dry form (in some embodiments a portion of 9-10 grams ready for use upon mixing and dissolved with water (in some embodiments a portion of 60 ml, capable of being administered by a feeding bottle, i.e. drinkable hence consistency and viscosity is low). The inventors of the present application have found that a composition comprising at least the above two components provides to an infant or a toddler or a subject in need thereof a regulated nutritional feeding that provides the necessary proteins, amino-acids, and other nutrients needed for a single serving of food.

When referring to almond, it should be understood to encompass any type of almond tree shelled drupe (*Prunus dulcis*, syn. *Prunus amygdalus* Batsch., *Amygdalus communis* L., *Amygdalus dulcis* Mill), in any type of form (peeled from seedcoat, unpeeled, ground, powdered, milled and so forth). The almond provides the lipid component of the composition (including, among others the essential linolenic and alpha linolenic acids).

In some aspects of the invention said almond can be replaced with at least one other nut selected from the following list: brazil nut, candlenut, cashew, Chilean hazelnut, macadamia, Malabar chestnut, mongongo, peanut, pine nut, pistachio, walnut and yeheb nut, or any combinations thereof with or without almond.

In some embodiments said almond component of a composition of the invention is pre-treated (i.e. prior to the addition of almond component to the composition of the invention) to lower the levels (amount) of phytic acid in said almond. Said pre-treatment of the almond component is performed by at least one of the following: treatment of almond component with phytase enzyme, soaking of said almond component in water, heating of almond component, peeling of almond, steaming of said almond, bleaching and roasting and any combinations thereof.

Under some embodiments, said reduction or lowering of phytic acid levels is for the removal of substantially all phytic acid from the almond component of a composition of the invention (i.e. said composition comprising no more than 0.001-0.5% wt of phytic acid).

In some embodiments said almond component of a composition of the invention is pre-treated, prior to its addition to the composition, said pre-treatment includes, but is not limited to: peeling of almond peel, steaming of said almond, heating, grinding, hydrolyzing, bleaching, roasting and so forth.

In some further embodiments said almond and/or non-dairy component comprising all essential amino acids are pre-treatment prior to their mixture in said composition of the invention for removal of fibers to the suitable levels for the intended population of subjects to be treated.

The term "non-dairy component" refers to a component of a composition of the invention which does not come from any dairy producing animal source, however comprises all essential amino acids needed for a composition for the nutrition of an infant, a toddler, an adult or an elderly person.

When referring to "essential amino acids" (or indispensable amino acids) it should be understood to encompass the amino acids that cannot be synthesized de novo by humans, and therefore must be supplied in the diet. In the context of the present application the list of essential amino acids include histidine, isoleucine, leucine, lysine, methionine, phenylalanine, threonine, tryptophan and valine.

When referring to an "infant" it should be understood to encompass a newborn neonate between the ages of 0 and 1 year old. This term includes both full term and premature neonates at any body weight.

When referring to a "toddler" it should be understood to encompass a human between the ages of 1 and 3 years. This term includes humans in this age range at any cognitive or health condition.

In the context of the present application when referring to nutrition of infants it should be understood to refer to the nourishment of infants by the use of food compositions that can substantially simulate human milk or its suitability as a complete or partial substitute for human milk. These food compositions (infant formula) can be used as the sole food source of an infant.

In the context of the present application when referring to nutrition of toddlers it should be understood to refer to the nourishment of toddlers by the use of food compositions that can provides all required nutritional values for the age group considering the fact that toddler food compositions (toddler formula or follow-on formula or growing up formula) are not the sole food source of a toddler.

In a further aspect the invention provides a composition comprising almond and at least one non-dairy component comprising all essential amino acids, wherein said composition is a non-dairy composition for use in supplementing the nutrition of a subject.

When referring to "supplementation of the nutrition of a subject" it should be understood to encompass qualitative and quantitative complementation of the nutrition of a subject (whether a human infant, toddler, child, adolescent, adult, elderly person at any health or physical condition) by the necessary recommended nutrients.

In yet another aspect the invention provides a composition comprising almond and at least one non-dairy component comprising all essential amino acids, wherein said composition is a non-dairy infant and/or toddler formula.

In another aspect the invention provides a composition comprising almond and at least one non-dairy component comprising all essential amino acids, wherein said composition is a non-dairy functional food formula.

When referring to "functional food formula" it should be understood to encompass a food or nutritional formula that serves to promote the health of a subject (in any condition of health, such as for example healthy subjects that participate in exercise and training of any kind) and/or prevent/ treat/ameliorate at least one disease or a symptom thereof (such as for example bowl diseases, malnutrition diseases, inflammatory diseases, cognitive and neurological diseases, cardiovascular diseases and so forth). Additionally, functional food may serve to supplement the nutrition of a subject recovering from a condition or disease in need of supplemental nutrients since their condition does not allow said subject to receive all dietary required for recovery. Functional food may also serve as additional supplemental food for patient population that are more vulnerable to malnutrition, subjects having lean body mass and declining basal metabolic rate, such as for example elderly subjects (age 65 and above).

The invention further provides a composition comprising almond and at least one non-dairy component comprising all essential amino acids, wherein said composition is a non-dairy composition for use in whole balance nutrition of a subject.

When referring to "whole balance nutrition of a subject" it should be understood to encompass the necessary essential ingredients needed by a subject (whether a human infant, toddler, child, adolescent, adult, elderly person at any health or physical condition) to sustain health and function.

The required nutritional levels, allowed supplements and additional additives are typically regulated in each country by the health authority responsible for food and drug regulation. Thus, compositions of the invention may further include any additional components required under each territorial regulation requirements, such as for example:

US Code of Federal Regulations Title 21, Part 107 (Infant formula)
Dietary reference intake of US National Academy of Sciences. Institute of Medicine. Food and Nutrition Board
European Commission Directive 2006/141/EC In some embodiments said at least one non-dairy component comprising all essential amino acids further comprises semi-essential amino acids.

In some embodiments said at least one non-dairy component comprising all essential amino acids is a single non-dairy component comprising all essential amino acids.

In other embodiments said at least one non-dairy component comprising all essential amino acids further comprises carbohydrates.

In other embodiments said at least one non-dairy component comprising all essential amino acids is pre-hydrolyzed (i.e. prior to addition to the composition of the invention). This hydrolyzation is performed for the purpose of hydrolyzing the carbohydrates of said at least one non-dairy component comprising all essential amino acids (such as for example buckwheat), thus reducing its viscosity. In some embodiments, said hydrolization of said at least one non-dairy component comprising all essential amino acids is performed by use of an acid or an enzyme (for example amylase).

In some other embodiments said at least one non-dairy component (such as for example buckwheat) is pre-gelatinized prior to its addition of a composition of the invention. This pre-gelatinization process is intended for making the carbohydrates in said non-dairy component to be biologically available to the subject treated with said composition. In some embodiments said pre-gelatinization is performed by at least one of heating, roasting, steaming said at least one non-dairy component prior to its addition to the composition of the invention.

In further embodiments a composition of the invention may include additional non-dairy sources of protein and/or fat including but not limited to pumpkin seeds, sunflower seeds, pinecone seeds, sesame seeds, flax seeds.

In other embodiments said at least one non-dairy component is selected from grain, fabaceae (including but not limited to beans, broad beans, chickpeas, peas, trigonella, caraway and so forth).

In some embodiments, said at least one non-dairy component is at least one type of grain.

In other embodiments said at least one type of grain is cereal grain or pseudocereal grain.

In some embodiments said almond is pre-treated to lower the level of phytic acid in said almond component or composition.

In other embodiments the ratio between almond and said at least one non-dairy component is from about 10:90 to about 90:10.

In other embodiments the ratio between almond and said at least one non-dairy component is from about 30:70 to about 70:30.

In yet further embodiments, almond is present in an amount of at least 10% by weight from the total weight of the composition.

In further embodiments said at least one non-dairy component is present in an amount of at least 5% by weight from the total weight of the composition.

Infant formulas come in powder, liquid concentrate, and ready-to-feed forms. They are designed to be prepared by the parent or caregiver in small batches and fed to the infant.

In some other embodiments said composition is in the form of a dry composition. In other embodiments, said composition is in the form of a water soluble dry powder. In other embodiments a composition of the invention further comprises a liquid. In some embodiments said liquid is water.

In some embodiments said at least one type of grain is cereal grain selected from the group consisting of maize (corn), rice, wheat, barley, sorghum, millet, oats, triticale, rye, fonio and any combinations thereof.

In other embodiments, said at least one type of grain is pseudocereal grain selected from buckwheat, amaranth and quinoa. In some embodiments said at least one type of grain is buckwheat. In some further embodiments said at least one type of grain is a whole grain.

In some embodiments a composition of the invention further comprises at least one additive selected from vitamins, minerals, trace elements, carbohydrates, lipids, proteins, probiotic agents (micro-organisms which, when administered in adequate amounts, confer a health benefit on the host), prebiotic agents (non-digestible food ingredients that stimulate the growth and/or activity of bacteria in the digestive system in ways claimed to be beneficial to health), nucleotides, poly-unsaturated fatty acids, fluoride, choline, and any combinations thereof (as required by the above noted Codex).

In other embodiments a composition of the invention further comprises at least one additive selected from nucleotides, poly-unsaturated fatty acids, fluoride, choline and any combinations thereof (as required by the above noted Codex).

In other embodiments a composition of the invention further comprises at least one additive selected from a flavoring agent, an oil protective colloid, a plasticizer, an antioxidant, a pro-biotic agent, a pre-biotic agent, an emulsifier, a thickener, an acidity regulator, a packaging gas and any combinations thereof (as required by the above noted Codex).

In some embodiments, said at least one additive is between about 0.001% to about 5% by weight of composition.

In some embodiments a composition of the invention is an infant or toddler formula.

In other embodiments a composition of the invention is an adult nutritional supplemental formula.

The invention further provides a process for the preparation of a formulation comprising the steps of: (a) mixing almond with at least one non-dairy component; (b) adding water to the mixture obtained in step (a) to obtain a suspension; (c) drying the suspension obtained in step (b), thereby obtaining a dry composition.

In some embodiments of a process of the invention the ratio between the almond and the said at least one non-dairy component is from about 10:90 to about 90:10.

In some embodiments of a process of the invention the ratio between the almond and the said at least one non-dairy component is from about 30:70 to about 70:30.

In other embodiments a process of the invention further comprises adding to the mixture obtained in step (a) from about 0.001% to about 5% of at least one additive.

In other embodiments of a process of the invention drying is by bed drying, drum drying, freeze drying, shelf dryers or spray drying.

In some embodiments said at least one non-dairy component is hydrolized prior to said mixing in step (a). In some other embodiments, said at least one non-dairy component is pre-treated prior to said mixing in step (a) with at least one of: grinding, steaming, roasting, heating, bleaching, peeling, hydrolization (enzymatic, using for example amylase, or chemical hydrolyzation) or any combination thereof.

In other embodiments said almond is treated for lowering (reducing or removing) the levels of phytic acid prior to said mixing in step (a). In some other embodiments, said almond is pre-treated prior to said mixing in step (a) with at least one of: grinding, steaming, heating, bleaching, roasting, peeling, removal of phytic acid (enzymatic, using for example phytase or a chemical removal of the acid) or any combination thereof.

In some embodiments said almond and/or non-dairy component are treated prior to said mixing in step (a) by at least one of peeling (for example of shell of said component), steaming, heating, gelatinization (also known as pre-gelatinization), grinding, hydrolyzing (for example using enzymes), bleaching, roasting and any combinations thereof.

In some other embodiments said at least one non-dairy component (such as for example buckwheat) is pre-gelatinized prior to step (a) of a process of the invention.

In some embodiments a composition of the invention comprises between 30-60 wt % (in some embodiments 45% wt) almonds, 20-50% wt (in some embodiments 33% wt) buckwheat, 10-30% wt (in some embodiments 20% wt) maltodextrine, 0.5-10% wt (in some embodiments 5% wt) mineral and vitamins, 0.5-10% wt (in some embodiments 5% wt) fatty acids (such as for example LCPUFA). In some other embodiments, said composition is a dry composition ready to be used upon dissolving in water or any other liquid (such as for example milk, almond milk, soy milk, fruit juice and so forth). In some further embodiments said composition dose is between about 5 to 15 grams capable of being dissolved in 50 to 60 ml of liquid to produce a drinkable feeding portion (i.e. a feeding portion that provides a single serving portion for the nutrition of a subject that is flowing to the extent that it can be administered through a feeding bottle or a feeding device). Feeding dose 8-15 times.

EXAMPLE 1

I. Almond component
 a. Almonds are pasteurized during drying in two steps: (a) in the slurry before the drum dryer. (72 C, 40 sec) and (b) on the drum dryer as part of the pre gelatinized.
 b. Reduction of the phytic acid content is performed by marinating and washing the almond component or by using phytase enzyme (process is controlled by heating the slurry to inactivate the phytase enzyme).
 c. Bleaching the almond component.

II. Buckwheat component
 a. The buckwheat should be pre gelatinized in order to be available for babies' consumption. The pre gelatinized process causes a high viscosity when the powder is mixed with water.
 b. The buckwheat can be hydrolyzed with enzymes (such as for example Amylase) in order to reduce its viscosity. The hydrolization process gives an ability to control fiber content to the levels required.
 c. The hydrolyzed process is taken place when the buckwheat is dissolved with water before drum drying.
 d. Amylase is added to the solution at 30-37 C.
 e. The enzyme is inactivated by raising the temperature to above 50 C.

III. Production process
 a. The Buckwheat is mixed in water.
 b. Heat the slurry to 37 C.
 c. Add and mix the enzymes.
 d. The slurry heated up to 55 C in order to inactivated the enzymes activity
 e. Add to the hydrolizated buckwheat and mix all other ingredients, that are: almonds, minerals, vitamins.
 f. Feed the slurry to the drum dryer.
 g. Drying conditions
 h. Dry mixing stage: with reactive metals Zn, Cu, Mg.

The invention claimed is:

1. A composition, comprising:
 a) an almond component that has been treated to reduce the phytic acid content; and
 b) a single non-dairy component comprising all essential amino acids, wherein said non-dairy component comprising all essential amino acids is a type of grain that has been pre-hydrolyzed or pre-gelatinized,
and wherein said composition is a non-dairy infant and/or toddler formula, providing said infant and/or toddler a whole balance nutrition suitable for infants and toddlers.

2. A composition according to claim 1, wherein said non-dairy component comprising all essential amino acids further comprises semi-essential amino acids.

3. A composition according to claim 1, wherein said non-dairy component comprising all essential amino acids further comprises carbohydrates.

4. A composition according to claim 1, wherein said type of grain is a cereal grain or a pseudocereal grain that comprises all essential amino acids.

5. A composition according to claim 1, wherein the ratio between said almond component and said non-dairy component is from about 10:90 to about 90:10.

6. A composition according to claim 1, wherein said almond component is present in an amount of at least 10% by weight from the total weight of the composition.

7. A composition according to claim 1, wherein said non-dairy component is present in an amount of at least 5% by weight from the total weight of the composition.

8. A composition according to claim 1, wherein said type of grain comprises cereal grain selected from the group consisting of maize, barley, sorghum, millet, oats, triticale, rye, fonio and any combinations thereof.

9. A composition according to claim 1, wherein said type of grain comprises a pseudocereal grain selected from the group consisting of buckwheat, amaranth and quinoa.

10. A composition according to claim 1, wherein said type of grain is buckwheat.

11. A composition according to claim 1, wherein said type of grain is a whole grain.

12. A composition according to claim 1, further comprising at least one additive selected from the group consisting of vitamins, minerals, trace elements, carbohydrates, lipids, proteins and any combinations thereof.

13. A composition according to claim 1, further comprising at least one additive selected from the group consisting of nucleotides, poly-unsaturated fatty acids, fluoride, choline, a probiotic agent, prebiotic agent, and any combinations thereof.

14. A composition according to claim 1, further comprising at least one additive selected from the group consisting of a flavoring agent, an oil protective colloid, a plasticizer, an antioxidant, an emulsifier, a thickener, an acidity regulator, a packaging gas and any combinations thereof.

15. A method of providing nutrition for an infant and/or toddler comprising administering to said infant and/or toddler the composition of claim 1.

16. A method of supplementing the nutrition of a subject comprising administering to said subject the composition of claim 1.

17. The composition of claim 1, wherein said almond component is selected from the group consisting of ground almond, powdered almond, and milled almond.

18. The composition of claim 1, wherein the composition comprises no more than 0.5% wt of phytic acid.

19. The composition of claim 1, wherein the composition comprises no more than 0.001% wt of phytic acid.

* * * * *